United States Patent [19]

Martin et al.

[11] Patent Number: 4,962,073

[45] Date of Patent: * Oct. 9, 1990

[54] SURFACE TREATED POROUS CERAMIC MEMBRANES AND METHOD OF MAKING SAME

[75] Inventors: Edward S. Martin, New Kensington; Larry F. Wieserman, Apollo, both of Pa.

[73] Assignee: Aluminum Company of America, Pittsburgh, Pa.

[*] Notice: The portion of the term of this patent subsequent to Oct. 3, 2006 has been disclaimed.

[21] Appl. No.: 265,243

[22] Filed: Oct. 31, 1988

Related U.S. Application Data

[63] Continuation-in-part of Ser. No. 23,312, Mar. 9, 1987, Pat. No. 4,871,711, which is a continuation-in-part of Ser. No. 946,870, Dec. 29, 1986, abandoned.

[51] Int. Cl.$^5$ .................... B01D 71/06; B01D 71/02; B01J 20/28; B01J 20/22
[52] U.S. Cl. .......................... 502/4; 55/16; 55/158; 210/500.21; 210/500.25; 210/500.26; 210/500.27; 427/244; 435/176; 435/177; 502/7; 502/401; 502/415
[58] Field of Search ............... 502/401, 407, 415, 162, 502/4; 427/244, 402, 220; 55/67, 186, 16, 158; 210/656-659, 198.2, 198.3, 1500.21, 500.25, 500.26, 500.27

[56] References Cited

U.S. PATENT DOCUMENTS

| | | |
|---|---|---|
| 3,013,904 | 12/1961 | Cupery .................................. 117/76 |
| 4,202,798 | 5/1980 | Johnson et al. ..................... 252/437 |
| 4,308,079 | 12/1981 | Venables et al. .............. 148/6.15 R |
| 4,382,016 | 5/1983 | Rickelton et al. .................. 252/428 |
| 4,506,628 | 3/1985 | Stockel .................................... 119/1 |
| 4,786,628 | 11/1988 | Wieserman et al. ................ 502/501 |
| 4,788,176 | 11/1988 | Wieserman et al. ................ 502/401 |
| 4,816,159 | 3/1989 | Khosah et al. ................... 210/502.1 |

OTHER PUBLICATIONS

"Selective Retention of Organic Phoshate Esters & Phosphonates on Aluminum Oxide"–Coletti Previero et al., *Bioscience Reports*–vol. 6, No. 5–1988, pp. 477–483.
"The Adsorption of Di-H-Butylphosphate on Alumina from Orgaic Solutions or Some Metal Oxides"–Gal et al., *J. Inorg. Nucl. Chem.*, vol. 25, 1963–pp. 129–130.

Primary Examiner—Paul E. Konopka
Attorney, Agent, or Firm—Andrew Alexander

[57] ABSTRACT

A treated permeable inorganic membrane is disclosed comprising a metal oxide/hydroxide capable of reacting with a phosphoric acid ester. The treated membrane has good chemical stability over a pH range of from 2 to 12. Chemically bonded to the metal oxide/hydroxide surface of the membrane is a monomolecular layer of one or more phosphoric acid esters selected from the class consisting of one or more phosphoric acid monoesters having the formula (RO)PO(OH)$_2$, one or more phosphoric acid diesters having the formula (RO)(R'O)PO(OH), and mixtures of same where R comprises a 1-30 carbon-containing group and R' comprises hydrogen or a 1-30 carbon-containing group. Excess phosphoric acid esters not bonded to the underlying membrane surface is removed to ensure formation of the monomolecular layer of the phosphoric acid esters on the surfaces of the membrane.

23 Claims, 1 Drawing Sheet

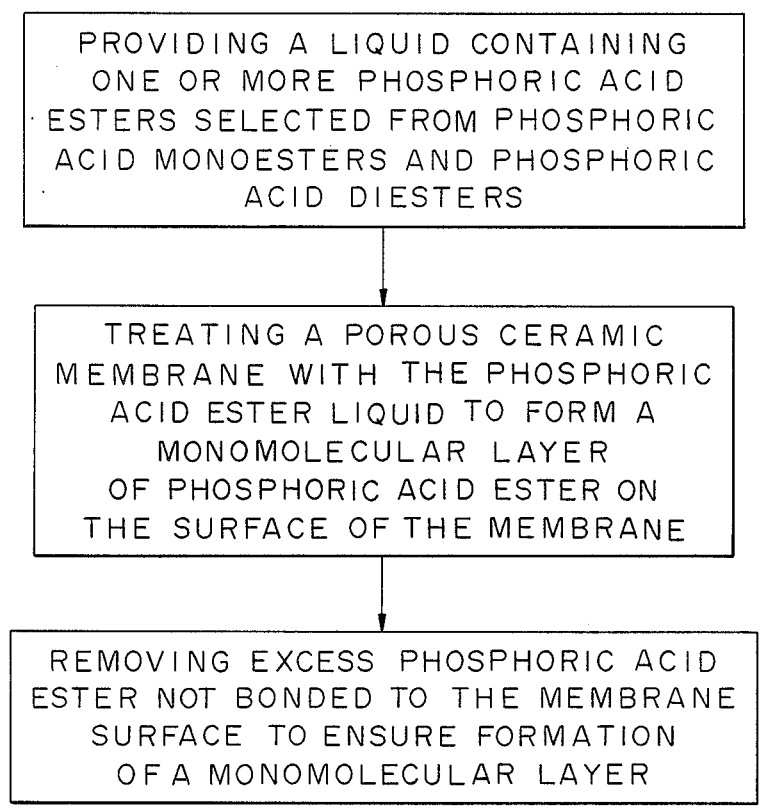

SURFACE TREATED POROUS CERAMIC MEMBRANES AND METHOD OF MAKING SAME

CROSS-REFERENCE TO RELATED APPLICATIONS

This application is a continuation-in-part of U.S. Ser. No. 023,312, filed Mar. 9, 1987, now U.S. Pat. No. 4,871,711, which is a continuation-in-part of U.S. Ser. No. 946,870, filed Dec. 29, 1986 (now abandoned), and is related to U.S. Ser. No. 023,423, filed Mar. 9, 1987, now U.S. Pat. No. 4,788,176 and U.S. Ser. No. 023,429, filed Mar. 9, 1987 now U.S. Pat. No. 4,786,628.

BACKGROUND OF THE INVENTION

1. Field of the Invention

This invention relates to permeable inorganic membranes. More particularly, this invention relates to permeable inorganic membranes stabilized to resist attack by acidic or alkaline solutions by coating the surface with a substantially monomolecular layer of a phosphoric acid ester. 2. Description of the Related Art Various inorganic membranes made from metals, inorganic polymers, and ceramics have been proposed for liquid and gas separations applications. The interest in utilizing such membranes in separations has increased since the advent of consistent quality, commercially available ceramic membranes with narrow size distributions. Inorganic membranes exhibit unique physical and chemical properties that are only partially or not shown by organic membranes. For example, they can be used at significantly higher temperatures, have better structural stability without the problems of swelling or compaction, generally can withstand more harsh chemical environments, are not subject to microbiological attack, and can be backflushed, steam sterilized, or autoclaved. Currently, microporous stainless steel, silver, and ceramic membranes such as alumina, zirconia, and glass are available commercially.

While such inorganic membranes such as the ceramic membranes offer distinct advantages over the more widely prevalent organic polymer membranes previously used, the pores of the inorganic membranes may also become blocked during usage. Pore blockage causes decreased permeability, flux, and efficiency of the membrane. Higher inlet pressures are then required to maintain a given flow rate. To restore membrane performance by opening pores, strongly acidic solutions (e.g., 2 wt. % nitric acid), or strongly basic solutions (e.g., 2 wt. % sodium hydroxide) are used to dissolve the solid materials clogging the pores. However, most inorganic membrane materials, particularly ceramic materials such as alumina and silica, are also attacked by such aggressive solutions. Enlargement of the pore dimensions or even partial dissolution of the entire membrane material can result. In both cases the membrane may be rendered useless for the intended application.

It would, therefore, be advantageous to provide a permeable inorganic membrane which would provide the previously discussed advantages over organic membranes yet also exhibit greater chemical stability over a wide range of pH to permit processing of the membrane to dissolve blockages without attack and destruction of the ceramic membrane itself.

In Wieserman et al U.S. Ser. No. 946,870, cross-reference to which is hereby made, there is described a method for treating a metal oxide/hydroxide substrate to provide a monomolecular layer of a phosphonic or phosphinic acid thereon to stabilize the surface of the substrate over a wide pH range. In Martin et al U.S. Ser. No. 023,312, cross-reference to which is also made, there is described a method for treating a metal oxide/hydroxide substrate to provide a monomolecular layer of a phosphoric acid ester thereon to stabilize the surface of the substrate over a wide pH range.

SUMMARY OF THE INVENTION

It is, therefore, an object of this invention to provide a treated permeable inorganic membrane having chemical stability over a wide pH range and which is formed by treating, with one or more phosphoric acid esters selected from the class consisting of one or more phosphoric acid monoesters, one or more phosphoric acid diesters, and mixtures of same, the surface of a permeable inorganic membrane capable of reacting with a phosphoric acid ester, and then removing the excess phosphoric acid esters not bonded to the underlying ceramic surface.

It is another object of this invention to provide a permeable inorganic membrane having chemical stability over a wide pH range and formed by treating the surface of a ceramic membrane selected from the class consisting of porous aluminum oxide, iron oxide, zirconium oxide, zeolites, and other amphoteric oxides with one or more phosphoric acid esters selected from the class consisting of one or more phosphoric acid monoesters having the formula $(RO)PO(OH)_2$, one or more phosphoric acid diesters having the formula $(RO)(R'O)PO(OH)$, or mixtures of same, where R comprises a 1–30 carbon-containing group and R' comprises hydrogen or a 1–30 carbon-containing group, and then removing the excess phosphoric acid esters not bonded to the underlying membrane surface.

It is yet another object of this invention to provide a permeable inorganic membrane of controlled porosity having chemical stability over a wide pH range and formed by treating the surface of a ceramic membrane selected from the class consisting of porous aluminum oxide, iron oxide, zirconium oxide, zeolites, and other amphoteric oxides with one or more phosphoric acid esters selected from the class consisting of one or more phosphoric acid monoesters having the formula $(RO)PO(OH)_2$, one or more phosphoric acid diesters having the formula $(RO)(R'O)PO(OH)$, and mixtures of same, where R comprises a 1–30 carbon-containing group and R' comprises hydrogen or a 1–30 carbon-containing group wherein the length of the R and/or R' group is varied to vary and control the size of the pores in the membrane, and then removing the excess phosphoric acid ester not bonded to the underlying membrane surface.

It is a further object of this invention to provide a porous aluminum oxide or zirconium oxide ceramic membrane having chemical stability over a wide pH range and formed by treating the surface of the aluminum oxide or zirconium oxide ceramic membrane with one or more phosphoric acid esters selected from the class consisting of one or more phosphoric acid monoesters having the formula $(RO)PO(OH)_2$, one or more phosphoric acid diesters having the formula $(RO)(R'O)PO(OH)$, and mixtures of same, where R comprises a 1–30 carbon-containing group and R' comprises hydrogen or a 1–30 carbon-containing group, and then removing the excess phosphoric acid esters not bonded to the underlying ceramic surface.

It is yet a further object of this invention to provide a method for making such treated permeable inorganic membranes.

These and other objects of the invention will be apparent from the following description and accompanying flowsheet.

BRIEF DESCRIPTION OF THE DRAWING

The sole drawing is a flowsheet illustrating the process of forming the treated porous ceramic membrane of the invention.

DETAILED DESCRIPTION OF THE INVENTION

The invention provides an improved permeable inorganic membrane having enhanced chemical stability over a wide pH range extending from about 1 to about 14 due to the presence of a monomolecular layer of a material formed on the surface of the ceramic membrane by treating, with one or more phosphoric acid esters, a porous ceramic membrane capable of reacting with the phosphoric acid ester to form a monomolecular layer, and then removing the excess phosphoric acid esters not bonded to the underlying membrane surface.

The permeable inorganic material may comprise any permeable membrane material capable of reacting with the phosphoric acid ester to form a monomolecular layer of material on the surface thereof, including the surfaces of the pores.

The term "membrane", as used herein, is defined to include any physical barrier comprising porous bonded material acting as a filter by selectively passing one or more components while rejecting others from a gaseous or liquid mixture or solution of components.

Particularly preferred inorganic membranes are those formed from elements and their oxides capable of reacting with the organic acid reactant to form the surface modified permeable inorganic membrane of the invention selected from the class consisting of Groups IIIa (Sc and Y), IVa (Ti, Zr, and Hf), Va (V, Nb, and Ta), VIa (Cr, Mo, and W), VIIa (Mn, Tc, and Re), VIII (Fe, Ru, Os, Co, Rh, Ir, Ni, Pd, and Pt), Ib (Cu, Ag, and Au), IIb (Zn, Cd, and Hg), IIIb (B, Al, Ga, In, and Tl), IVb (Ge, Sn, and Pb), Vb (As, Sb, and Bi), elements in the lanthanide series and the actinide series, mixtures thereof, and mixtures of Groups IIa (Be, Mg, Ca, Sr, Ba, and Ra) and VIb (Se, Te, and Po).

Of the above metals, titanium, cobalt, zirconium, iron, Cr-Ni-Fe stainless steel alloys, nickel, chromium, and the precious metals, Ru, Os, Co, Rh, Ir, Pd, Pt, Ag, and Au are particularly preferred; while of the above metal oxides, aluminum oxide, iron oxide, titanium oxide, zirconium oxide, and zeolites are particularly preferred. In an especially preferred embodiment, the permeable inorganic membrane to be treated comprises aluminum oxide or zirconium oxide.

The pore diameters of the permeable inorganic membrane, prior to treatment in accordance with the invention may range from about 5 Å to about 1000 microns, preferably about 40 Å up to about 10 microns, while the pore diameters, after treatment with the organic acid material may range from about 0.1 Å to about 1000 microns, preferably from about 35 Å up to about 10 microns.

It should be noted that while the porosity of the membrane materials has been discussed with regard to pore diameter, measurement of the porosity is sometimes referred to as the pore volume due to the nature of the nitrogen absorption measurement technique.

The one or more phosphoric acid esters which may be reacted with the permeable inorganic membrane are selected from the class consisting of one or more phosphoric acid monoesters having the formula (RO)PO(OH)$_2$, one or more phosphoric acid diesters having the formula (RO)(R'O)PO(OH), and mixtures of same, where R' may be hydrogen and both R and R' may each be comprised of 1–30, preferably 5–30, carbon-containing molecules such as an alkyl group.

Other examples of groups which may, in appropriate case comprise R and/or R' include long and short chain aliphatic hydrocarbons, aromatic hydrocarbons, aldehydes, ketones, amines, amides, thioamides, imides, lactams, anilines, pyridines, piperidines, carbohydrates, thiocyanates, esters, lactones, ethers, alkenes, alkynes, alcohols, nitriles, oximes, organosilicones, sulfur containing organic compounds, ureas, thioureas, perfluoro organic groups, perchloro organic groups, perbromo organic groups, and combinations of these groups. The phosphoric acid ester molecules such as listed above may also include inorganic groups substituted thereon such as halogens, nitrates, phosphates, halogens, nitrates, phosphates, phosphi-nates, phosphinites, phosphonates, quaternary ammonium salts, and the like.

Preferably, the groups which may comprise R and/or R' include long and short chain aliphatic hydrocarbons, aromatic hydrocarbons, amines, imides, anilines, pyridines, piperidines, carbohydrates, thiocyanates, ethers, alkenes, alkynes, alcohols, nitriles, organosilicones, sulfur containing organic compounds, perfluoro organic groups, perchloro organic groups, perbromo organic groups, and combinations of these groups.

The size of the R or R' group on the phosphoric acid ester molecule may also be used to regulate or alter the pore size of the porous ceramic membrane by, for example, increasing the length of the chain of the R group to decrease the pore size.

Examples of organic reactants which may comprise precursors which may partially decompose upon contact with the permeable inorganic membrane to form the functionality capable of reacting with the inorganic membrane may include pyrophostate esters or acid halides having the formula RR'PO$_3$X or RPO$_2$X$_2$ where R and R' are the same as above discussed, and X is a halide selected from the class consisting of chlorine, bromine and iodine.

The size of the R or R' group on the organic acid molecule may also be used to regulate or alter the pore size of the permeable inorganic membrane by, for example, increasing the length of the chain of the R group to decrease the pore size. In addition, it must be noted that the effective pore size may also be changed by the type of organic acid molecule without changing the physical size of the pore, such as, for example, when the hydrophobicity of the pore is changed.

While it is preferred that the free end of the phosphoric acid ester molecule extends away from the surface of the permeable inorganic membrane, it is within the scope of the present invention to provide, on the free end of the molecule, functional groups. Functional groups may be defined as the group on the molecule which enables the monomolecular layer (comprising the phosphoric acid ester bonded to the metal oxide/hydroxide surface of the permeable inorganic membrane) to react with, attract, couple to, bond with, etc. other atoms, ions and/or molecules. By attaching specific functional groups, either organic or inorganic, to the R and R' groups of the phosphoric acid esters, a wide variety of selectivities and capacities are provided.

The functional groups attached to or contained within the free end can be selected from cation exchange functional groups and anion exchange functional groups such as $-SO_3H$, $-N^+(CH_3)_3Cl$, $-COONa$, $-NH_2$ and $-CN$, for example. The $-SO_3H$ functional group permits removal of cations such as $Cu+2$, $Fe+2$, $Co+2$, $Cd+2$, $Ca+2$, $Sr+2$, $Hg+2$, $Pb+2$, $Ba+2$ and $Be+2$ from aqueous media. The functional group, $-CH_2N(CH_3)_3Cl$, permits removal of anions such as $HSO_4^-$, $ClO_3^-$, $NO_3^-$, $NO_2^-$, $HPO_4^-$, formate, and citrate. Other examples of functional groups that may terminate the free end of the phosphoric acid ester chain include the following: a glucose group, a monoclonal antibody, a cyano group ($-CN$), a phenyl group, a diphenyl group, a tertiary butyl group, a sulfonic group, a benzyl sulfonic group, protein groups such as protein A (staphytococcal protein A), enzyme groups, dye molecules, chelated metal groups, tag molecules and combination of these groups. Further, it should be noted that the carbon group can be a saturated or unsaturated carbon chain.

Acid phosphate esters of organic poly alcohols, such as glycerine (glycerol), or monosaccharides such as glucose, can be used to create a surface which will not interact with proteins to denature those proteins. Examples are $\alpha$-glycerophosphoric acid, glucose, 6-phosphate, etc.

It will be noted that the R or R' groups are always monomers or oligomers. Preferably, the oligomers have a molecular weight of less than 2000. By the use of monomer herein is meant to include a chemical compound that can undergo polymerization. By oligomer is meant a polymer or polymer inter-mediate containing relatively few structural units, i.e., a polymer containing 2–4 monomers.

The term "metal oxide", as used herein is intended to define a broad spectrum of oxides of a particular metal ranging from those which may contain few hydroxides, e.g., activated forms of aluminum oxide (alumina), to more hydrated forms which may comprise mainly hydroxide, e.g., $Al(OH)_3$. It has been found, however, that metal oxide forms in which hydroxides are also present in significant quantities, rather than metal oxides with few, if any, hydroxides, provide a better bond with the phosphoric acid ester molecule with which it is reacted. However, for certain applications, dehydrated or activated forms of the metal oxide may be preferred due to the higher surface area of such materials. For example, when aluminum oxide is used, the hydrated form will be preferred, e.g., gibbsite, bayerite, or boehmite will be preferred, when a large external surface area is desired and activated alumina will be preferred when it is desirous that the metal oxide have a high internal surface area. Thus the permeable inorganic material useful in the practice of this invention may also be properly referred to as a "metal oxide/hydroxide" and this term is intended to mean the same as the term "metal oxide" for purposes of this invention.

As presently understood, the permeable metal oxide/hydroxide inorganic membranes suitable for use in the present invention usually require hydroxyl groups on the surfaces thereof for purposes of providing bonding sites for the acid group or groups of the organic acid, i.e., hydroxyl groups on the metal oxide surfaces react to form a chemical bond with the organic acid groups. For example, when the permeable inorganic membrane is alumina, hydroxyl groups on the surface of the alumina react with the ester group or groups of the phosphoric acid ester acid, e.g., with the $-POOH$ acid group of the phosphoric acid ester. It will be appreciated that if more than a monomolecular layer of hydroxyl units are present on the permeable inorganic membrane surfaces, such as hydroxyl units present as a result of water, this additional water layer can act to hinder the reaction. Thus, while it is preferred to have a maximum of a monomolecular layer of hydroxyl units, less than a complete surface layer of hydroxyl units can be present on the permeable inorganic membrane and such does not hinder reactivity between the metal oxide comprising the permeable inorganic membrane and the phosphoric acid ester.

To produce the treated permeable inorganic membrane, the metal oxide/hydroxide surface of the permeable inorganic membrane is reacted, in accordance with the invention, with one or more phosphoric acid esters of the types discussed. This may be carried out by passing or pumping the phosphoric acid esters through the permeable inorganic membrane. The permeable inorganic membrane, such as alumina or zirconia, may be reacted with the phosphoric acid ester in a suitable media, including an aqueous or nonaqueous solution, emulsion, or suspension, at a temperature of from just above the freezing point to the boiling point of the solution, typically from about 10° C. up to about 90° C., preferably about 50° C., for a period of from at least 0.01 second to not more than 20 hours, and preferably from at least about 0.5 hours up to about 4 hours, using an initial acid concentration of at least about 0.0001 to 0.1 molar. In some instances higher concentrations may be desired. When the media is non-aqueous, the temperature range can be greatly extended. For example, it may range from 5° C. or lower to 200° C. or sometimes higher depending on the solvent.

The reaction is normally carried out at atmospheric pressure. However, the use of an elevated pressure or a sub atmospheric pressure should be deemed to be within the scope of the invention. A flowing bed reactor or an aerosol may also be utilized in the treatment of the permeable inorganic membrane with the organic acid. The thickness of the resulting phosphoric acid ester monomolecular layer bonded to the porous ceramic membrane is in the range of 2 to 5000 Å and preferably 3 to 500 Å.

The process must be controlled so as to prevent the R or R' groups from bonding to each other to form weakly adsorbed multilayers which would then provide further hydroxyl units, i.e., $-POOH$ units directed away from and not bonded to the surface of the metal oxide/hydroxide particles, thereby defeating the purpose of the invention, for example, when it is used for an adsorbent.

In accordance with the invention, to ensure formation of only a monomolecular layer of the phosphoric acid ester molecules on the metal oxide/hydroxide surface of the permeable inorganic membrane, the treated surface is then washed with any solvent which is capable of removing excess phosphoric acid ester molecules which are bound to other phosphoric acid ester molecules, i.e., are not chemically bound to the metal oxide/hydroxide surfaces of the permeable inorganic membrane, and which will not attack the phosphoric acid ester molecules already chemically bonded to the metal oxide/hydroxide surface. In a preferred embodiment, a sodium hydroxide solution, having a concentration ranging from about 0.001 to 1 molar and buffered with sufficient sodium bicarbonate to maintain the pH in a range of from about 9-12, is used as the wash solution to remove the excess phosphoric acid ester molecules, leaving only the desired monomolecular layer.

Other wash solutions which may be used instead of the sodium hydroxide include potassium hydroxide and ammonium hydroxide solutions which may also be buffered to provide approximately the same pH range.

The wash solution may also comprise a weak acid such as a carboxylic acid, e.g., acetic or formic acid or a weak mineral acid (0.1-2N) such as sulfuric, nitric, or hydrochloric acid. The wash solution might also comprise an alcohol such as isopropanol or butanol. However, the use of bases as wash solutions are preferred since the resulting salts, e.g., sodium or potassium salts, are more soluble.

While we do not wish to be bound by any particular theory of bonding, it is believed that when the metal oxide/hydroxide surface of the permeable inorganic membrane, for example, alumina, is brought into contact with the phosphoric acid ester, a reaction or adsorption of the ester on the alumina takes place in which the metal, e.g., aluminum, and phosphorus atoms in the ester molecules are apparently bonded together through an oxygen atom as illustrated in the formulas below, which show alumina, by way of example, as the permeable inorganic membrane:

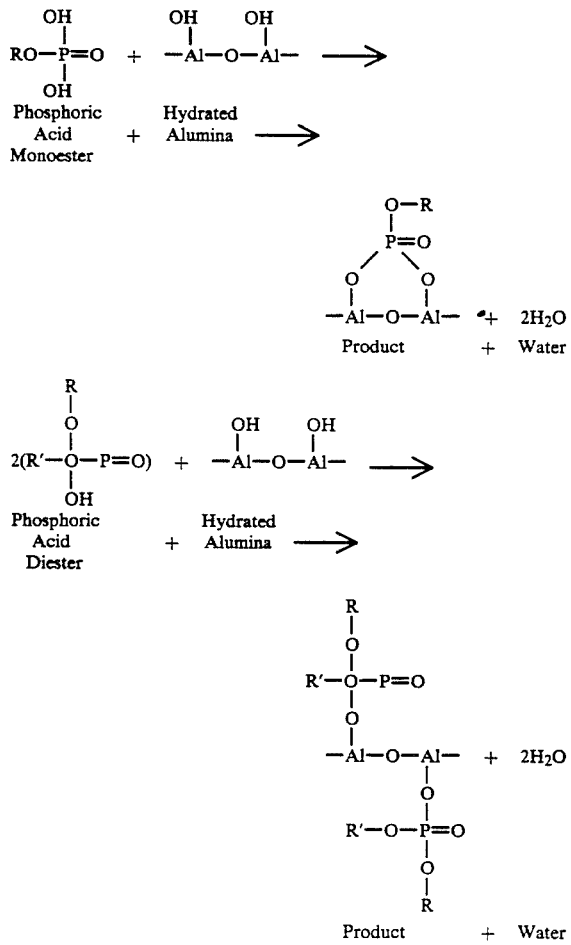

Note: Aluminum ions may be an octrahedrally or tetrahedrally coordinated cation with or without coordination vacancies at or near the surface (external or within pore structures).

Thus it can be seen, using the above proposed models, that if all, or substantially all, of the exposed hydroxyl groups on the surface of the alumina can be reacted with the ester groups, the surface chemistry of the reacted porous ceramic membrane, e.g., alumina will be changed. Furthermore, the type of organic radical attached to the phosphoric acid ester can be tailored to achieve certain types of affinities to provide selectivity in the characteristics of the product.

By reaction of "substantially all" of the hydroxyl groups on the metal oxide/hydroxide surface of the permeable inorganic membrane is meant reaction of at least 99% of the hydroxyl groups, and preferably 99.9% of such hydroxyl groups with the phosphoric acid ester to ensure bonding to substantially all of the reactive sites which could otherwise be attacked by the acids or bases used, for example, to unclog the pores of the membrane after usage.

By "monomolecular layer" is meant that 90%, and preferably 98%, and most preferably substantially all of the phosphoric acid ester molecules are bonded to the metal oxide/hydroxide surface of the permeable inorganic membrane as a single layer of molecules.

As noted earlier, while it is desired to avoid organic polymers where the chain has repeating phosphorus-containing groups which can bond to the metal oxide particle surface, oligomers having preferably a single phosphorus-bonding group may be utilized. The single phosphorus-bonding group permits the oligomer to have a free end which extends away from the permeable inorganic membrane surface. Additionally, the monomer or oligomer comprising the monomolecular layer may have reactive sites which can permit crosslinking so as to polymerize monomers or oligomers already bonded to the surface of the membrane.

It is preferred that the monomer or oligomer used is comprise at least a five-carbon chain. The chain may have 20 to 30 or more carbons, as noted earlier. The longer chains preferably are used in the initial bonding or loading of the membrane surface with the phosphoric acid ester material. However, because of the pores and fissures that comprise the surface of the permeable inorganic membrane, often all the surface hydroxyl units are not reacted because of the inability of the longer chain phosphoric acid ester material reaching or diffusing into the pores and fissures. Thus, to inert or block remaining reactive sites, short-chain monomers or oligomers, e.g., less than 6 carbon molecules per chain, can be used. In this way, all of the reactive sites are capped or blocked. That is, for capping off the reactive sites, short-chain monomers can be used. For example, an alumina treated with a high molecular weight phosphoric acid ester, e.g. an n-dodecylphosphate ester, or a dicetylphosphate acid ester (dihexadecylphosphate ester) may be further treated with a low molecular weight phosphoric acid ester, e.g., methylphosphate ester, to treat any remaining unreacted alumina surface areas.

In the present invention, the weight of the monomolecular layer on the permeable inorganic membrane can range from about $10^{-6}$ to 75 wt. % calculated on the total weight of the coated membrane, and preferably the monomolecular layer can range from about $10^{-5}$ to 50 wt. %. For purposes of ensuring that a monomolecular layer of phosphoric acid ester material is bonded to the metal oxide/hydroxide surface of the permeable inorganic membrane, the application should be carefully controlled. That is, a monomolecular layer can be obtained, for example, by controlling the viscosity of the aqueous medium of solution, the time of exposure in the solution, the concentration and volume of phosphoric acid ester material in the solution, or the concentration of hydroxyl units on the metal oxide/hydroxide surface, as well as the previously discussed washing and rinsing of the treated surface to remove excess phosphoric acid ester not bonded to the metal oxide/hydroxide surface.

Having thus described the invention, what is claimed is:

1. A treated permeable inorganic membrane having a metal oxide/hydroxide surface and having bonded thereto a substantially monomolecular layer of phosphoric acid ester material, and the bond formed between the oxide or hydroxide group on the membrane and the acid group on the phosphoric acid ester, the ester material selected from the class consisting of:
   (a) one or more phosphoric acid monoesters having the formula $(RO)PO(OH)_2$;
   (b) one or more phosphoric acid diesters having the formula $(RO)(R'O)PO(OH)$; and
   (c) mixtures of same; where R comprises a 1-30 carbon-containing group and R' comprises hydrogen or a 1-30 carbon-containing group.

2. The treated membrane of claim 1 wherein said monomolecular layer of phosphoric acid ester acid material is chemically bonded to at least 99% of the reactive sites on said surface.

3. The permeable inorganic membrane of claim 1 wherein said membrane comprises one or more oxide/hydroxides of elements selected from the class consisting of Groups IIIa (Sc and Y), IVa (Ti, Zr, and Hf), Va (V, Nb, and Ta), VIa (Cr, Mo, and W), VIIa (Mn, Tc, and Re), VIII (Fe, Ru, Os, Co, Rh, Ir, Ni, Pd, and Pt), Ib (Cu, Ag, and Au), IIb (Zn, Cd, and Hg), IIIb (B, Al, Ga, In, and Tl), IVb (Ge, Sn, and Pb), Vb (As, Sb, and Bi), an element in the lanthanide series, an element in the actinide series, mixtures thereof, and mixtures of Groups IIa (Be, Mg, Ca, Sr, Ba, and Ra) and VIb (Se, Te, and Po).

4. The treated membrane of claim 2 wherein said treated membrane has an average pore size of from about 0.1 Å to about 1000 microns in diameter.

5. The permeable inorganic membrane of claim 2 wherein said membrane is selected from the class consisting of aluminum oxide/hydroxide and zirconium oxide/hydroxide.

6. The permeable inorganic membrane of claim 5 wherein said membrane comprises aluminum oxide/hydroxide.

7. The permeable inorganic membrane of claim 6 wherein said membrane has a surface area in the range of 0.1 to 600 $m^2/g$.

8. The permeable inorganic membrane material of claim 5 wherein said membrane comprises zirconium oxide.

9. The permeable inorganic membrane of claim 8 wherein said porous zirconium oxide has a surface area in the range of 0.1 to 600 $m^2/g$.

10. The permeable inorganic membrane of claim 2 wherein the thickness of said monomolecular layer of phosphoric acid ester material chemically bonded to said metal oxide/hydroxide surface is in the range of 10 to 5,000 Å.

11. The permeable inorganic membrane of claim 10 wherein the thickness of said monomolecular layer of phosphoric acid ester material chemically bonded to said metal oxide/hydroxide surface is in the range of 3 to 500 Å.

12. The permeable inorganic membrane of claim 2, wherein said R group of said phosphoric acid ester material contains at least 1 carbon atoms.

13. The permeable inorganic membrane of claim 2 wherein said R group or said R' group comprises an organic radical selected from long and short chain aliphatic hydrocarbons, aromatic hydrocarbons, carboxylic acids, amines, imides, anilines, pyridines, piperidines, carbohydrates, ethers, alkenes, alkynes, alcohols, nitriles, oximes, organosilicones, sulfur containing organic compounds, perfluoro organic molecules, perchloro organic molecules, perbromo organic molecules and combinations of these groups.

14. The permeable inorganic membrane of claim 2 wherein said R group or said R' group has a functional group attached to a portion of said organic acid material spaced from the portion of said material bonded to said metal oxide/hydroxide surface and selected from the class consisting of a glucose group, a cyano group, a cyanate group, isocyanate group and thiocyanate group, a phenyl group, a diphenyl group, a tertiary butyl group, a sulfonic group, a benzyl sulfonic group, a halogen group, nitrate group, phosphate group, phospinate group, phosphinite group, phosphonate group, quaternary ammonium salt group and combinations of these groups.

15. The permeable inorganic membrane of claim 2 wherein the ester material has attached thereto a group selected from the class consisting of $-SO_3H$, $-N^+(CH_3)_3Cl$, $-COONa$, $-NH_2$ and $-CN$.

16. The permeable inorganic membrane of claim 2 wherein said monomolecular layer of phosphoric acid ester material is substantially free of hydroxyl groups after chemically bonding to said metal oxide/hydroxide surface.

17. A permeable inorganic membrane selected from porous aluminum oxide and zirconium oxide, said membrane having a surface area of from about 0.10 to about 600 $m^2/gram$, good chemical stability over a pH range of from 1 to 14, and having bonded to the surface thereof a monomolecular layer of one or more phosphoric acid monoesters having the formula $(RO)PO(OH)_2$, where R comprises a 1-30 carbon-containing group, and wherein excess phosphoric acid monoester not bonded to the underlying membrane surface is removed to ensure formation of said monomolecular layer of said phosphoric acid monoester on the surfaces of said membrane.

18. A permeable inorganic membrane selected from porous aluminum oxide and zirconium oxide, said membrane having a surface area of from about 0.10 to about 600 $m^2/gram$, good chemical stability over a pH range of from 2 to 12, and having bonded to the surface thereof a monomolecular layer of one or more phosphoric acid diesters having the formula $(RO)(R'O)PO(OH)$, where R comprises a 1-30 carbon-containing group and R' comprises hydrogen or a 1-30 carbon-containing group, and wherein excess phosphoric acid diester not bonded to the underlying surface is removed to ensure formation of said monomolecular layer of said phosphoric acid diester on the surfaces of said membrane.

19. A process for bonding a monomolecular layer of one or more phosphoric acid esters to a permeable inorganic membrane selected from the class consisting of Groups IIIa (Sc and Y), IVa (Ti, Zr, and Hf), Va (V, Nb, and Ta), VIa (Cr, Mo, and W), VIIa (Mn, Tc, and Re), VIII (Fe, Ru, Os, Co, Rh, Ir, Ni, Pd, and Pt), Ib (Cu, Ag, and Au), IIb (Zn, Cd, and Hg), IIIb (B, Al, Ga, In, and Tl), IVb (Ge, Sn, and Pb), Vb (As, Sb, and Bi), an element in the lanthanide series, an element in the actinide series, mixtures thereof, and mixtures of Groups IIa (Be, Mg, Ca, Sr, Ba, and Ra) and VIb (Se, Te, and Po) to form a coated membrane having good chemical stability over a pH range of from 1 to 14 which comprises:
 (a) providing a liquid containing one or more phosphoric acid esters therein selected from the class consisting of:
  (i) one or more phosphoric acid monoesters having the formula $(RO)(OH)_2$;
  (ii) one or more phosphoric acid diesters having the formula $(RO)(R'O)PO(OH)$; and
  (iii) mixtures of (ii) and (ii); where R comprises a 1-30 carbon-containing group and R' comprises hydrogen or a 1-30 carbon-containing group; and
 (b) contacting the surface of said permeable inorganic membrane with said liquid containing said one or more phosphoric acid esters to form a monomolecular layer of said phosphoric acid ester on said surface; and
 (c) removing the excess phosphoric acid ester not bonded to the underlying surface to ensure formation of a monomolecular layer of said phosphoric acid ester on the surfaces of said membrane.

20. The process of claim 19 wherein said step of providing a liquid containing phosphoric acid esters therein further comprises maintaining a concentration of said phosphoric acid esters in said liquid of at least about 0.01 molar.

21. The process of claim 19 wherein said step of contacting said surface with said liquid containing said phosphoric acid esters further comprises maintaining said contact for from about 0.01 second to about 20 hours.

22. The process of claim 21 wherein said step of contacting said surface with said liquid containing said phosphoric acid esters further comprises maintaining said contact for from about 0.5 to about 4 hours.

23. The process of claim 19 wherein said step of contacting said surface with said liquid containing said phosphoric acid esters further comprises maintaining the temperature of the reactants within a range of about 5° to 150° C. during said contacting step.

* * * * *